G. L. FESSENDEN.
MANUFACTURE OF GLASS BOWLS, TUMBLERS, &c.
No. 184,604. Patented Nov. 21, 1876.
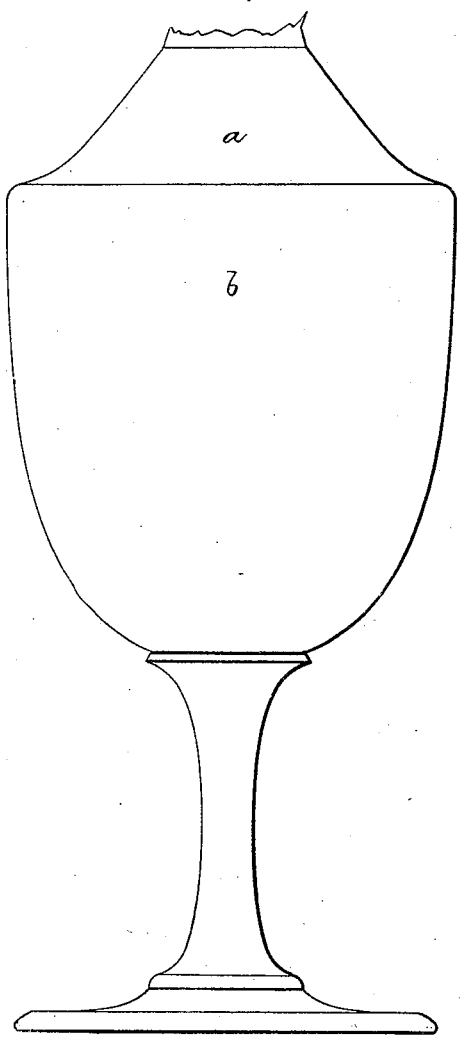
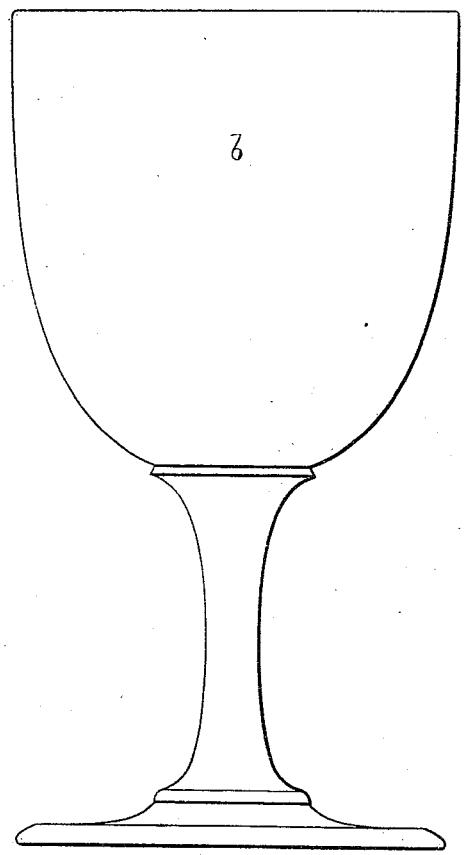
Witnesses
S. W. Piper
L. W. Miller
George L. Fessenden,
by his attorney
R. H. Eddy.

UNITED STATES PATENT OFFICE.

GEORGE L. FESSENDEN, OF SANDWICH, MASSACHUSETTS.

IMPROVEMENT IN MANUFACTURE OF GLASS BOWLS, TUMBLERS, &c.

Specification forming part of Letters Patent No. 184,604, dated November 21, 1876; application filed October 2, 1876.

*To all whom it may concern:*

Be it known that I, GEORGE L. FESSENDEN, of Sandwich, in the county of Barnstable and State of Massachusetts, have invented a new and useful Improvement in the Manufacture of Glass Bowls, Tumblers, or other articles of like character; and do hereby declare the same to be fully described in the following specification, and represented in the accompanying drawings, of which—

Figure 1 denotes an elevation of a goblet with its bowl blown in a mold. Fig. 2 is a side view of the goblet as finished.

My invention relates to the manufacture of bowls of glass, especially those of tumblers, goblets, wine-glasses, and various other articles of like character.

In carrying out the invention, I first blow the bowl in a mold by the well-known process of glass-blowing in a mold, in which case the bowl will be closed at the top, except there will be a blow-hole in the upper part of it, such closing of the bowl being as shown at *a* in Fig. 1.

After the bowl has been so blown it (with or without a foot fixed to it) is to be put into an annealing-furnace and there be annealed, and, after it may have been cooled, the top or superfluous part *a* is to be cut or cracked off from the rest, or part *b*, by a hot iron or other suitable means.

Such having been done, the bowl or part *b* is next to be plunged into the mouth of a glass-melting pot, while in a heated state, or into the flame of a "glory-hole," and there be submitted to a heat, such as will fuse and round the cut or cracked edge and fire-polish it, and the outer and inner surfaces of the bowl.

By this process tumblers or bowls may be made at much less expense, and in a better manner, and, with a finer finish, than by the old process, involving the opening, shearing off, and finishing of the bowl by hand, with the aid of tools. By my process, the molding of the bowl, and subsequently cutting or cracking off the superfluous part, and otherwise treating the whole as described, causes each bowl of a set or series to be of like size, which is a matter of much importance.

I claim—

1. My improvement in the art of making a glass bowl or article of glass having a bowl, such consisting in blowing the bowl in a mold, and next annealing such bowl, and, when cool, cutting or cracking off the cap or superfluous part, and finally submitting the rest (whether with or without a foot) to heat by means as described, so as to fuse the upper edge and round it, and fire-polish it, and also fire-polish the inner and outer surfaces of the article, all essentially as set forth.

2. As an improved article of manufacture, a glass bowl or article of glass, having a bowl made by the process described.

GEORGE L. FESSENDEN.

Witnesses:
C. H. LAPHAM,
C. H. CHAPOINT.